US005668853A

United States Patent [19]

Florence et al.

[11] Patent Number: 5,668,853
[45] Date of Patent: Sep. 16, 1997

[54] TELECOMMUNICATIONS CALLING FEATURE METHOD AND APPARATUS

[75] Inventors: Lloyd Malcolm Florence, Scarborough; Paul Michael Brennan, Toronto, both of Canada

[73] Assignee: Northern Telecom Limited, Montreal, Canada

[21] Appl. No.: 942,876

[22] Filed: Sep. 10, 1992

[51] Int. Cl.[6] .................................................. H04M 1/64
[52] U.S. Cl. ............................ 379/67; 379/212; 379/215; 379/258
[58] Field of Search .................................. 379/67, 88, 89, 379/202, 211, 212, 215, 201, 207, 81, 74, 258

[56] References Cited

U.S. PATENT DOCUMENTS

| | | | |
|---|---|---|---|
| 4,608,685 | 8/1986 | Jain et al. | 370/85 |
| 4,878,240 | 10/1989 | Lin et al. | 379/67 |
| 4,893,310 | 1/1990 | Robertson et al. | 370/110.1 |
| 4,932,042 | 6/1990 | Baral et al. | 379/67 |
| 4,942,601 | 7/1990 | Park | 379/215 |
| 4,967,408 | 10/1990 | Phan | 370/62 |
| 5,131,024 | 7/1992 | Pugh et al. | 379/67 |
| 5,181,236 | 1/1993 | LaVallee et al. | 379/67 |

OTHER PUBLICATIONS

SL-1: All Digital Cost-Conscious Time Saving Telephone System, The Innovators, vol. 2, No. 4, Dec. 1975 pp. 5–7.
Everything the Modern Business Office Can Ask for in Telecommunications, The Innovators, vol. 2, No. 4, Dec. 1975, pp. 8–9.
The Evolution of the SL-1 PBX, Dinker Bir et al, Telesis 1984 One, pp. 20–27.

Primary Examiner—Fan Tsang
Attorney, Agent, or Firm—J. E. Moorhouse; George MacGregor

[57] ABSTRACT

A telephone caller is permitted to retrieve his call from the central voice services feature of an unavailable called party, and resume the call progress by substituting a calling feature of his own. In a telephone system including a telephone switching facility and a voice features server, provision is made for enabling a calling party to invoke an appropriate calling party feature such as a ring back feature or an override feature, and thereby subsequently achieve a real time conversation with the called party instead of simply being able to leave a voice message for the called party.

9 Claims, 3 Drawing Sheets

TELECOMMUNICATIONS CALLING FEATURE METHOD AND APPARATUS

The invention is in the field of telephony voice services and more particularly relates to a real time communications feature in an otherwise non real time voice services feature.

BACKGROUND OF THE INVENTION

At one time, automatic telephone exchanges were typically limited to providing plain ordinary telephone service, sometimes referred to as "POTS". With POTS, a telephone user may make a telephone call by dialling a telephone number which identifies the telephone set of another telephone user with whom communication is desired. The telephone user who initiates the call is referred to as a calling party, and the telephone user to whom the call is directed is referred to as a called party. A telephone call involves various elements of the telephone exchange. These elements. operate in concert to provide a communication path for the duration of the communication, be it with the called party or alternately with other means to inform the calling party that communication with the party designated by the dialled telephone number is unavailable. Depending upon prevailing conditions of the moment, each such telephone call follows a well known progression of events and is termed a call progress. A call progress is initialized when the telephone user actuates a telephone terminal apparatus. This actuation is usually referred to as going OFF HOOK. This initializing event is usually followed by some action being performed by the user. If the user is the calling party, the user indicates an identity of the called party by pressing or dialling the digits associated with the called party's telephone set, that is, the called party's telephone number. Such action will usually cause one of three typical call progresses in the telephone system, which are briefly summarized as follows:

1) The called party answers by going OFF HOOK, in response to ringing of the called party's telephone set, whereby the calling party is provided with a real time communication or conversation with the called party;

2) The called party will not answer, as the called party is unresponsive to ringing or the called party is already using his telephone set, in which case the calling party has no recourse but to terminate the call progress by going ON HOOK; and 3) The telephone call is intercepted by or forwarded to a voice service feature associated with the called party which answers on behalf of the called party. In this case the calling party is usually urged to leave a message for the called party, whereby the calling party may have a delayed communication transmitted to the called party.

A primary function of a voice services feature is that of is providing an opportunity for a calling party to leave a message for subsequent receipt by a called party. The first such message service was provided by a service person or a special operator who arranged to intercept telephone calls on behalf of a subscriber to the service. This personal service is relatively expensive and consequently has never become commonplace in the day to day activities of most telephone users. However, in the last decade or so, machine implementations of telephone answering and voice messaging services, which do not require the attention of a service person or a special operator, have become relatively commonplace and inexpensive to use. Telephone answering service is available by means of any of various user purchasable answering machines for use with individual telephone terminal apparatus. Alternately more sophisticated voice messaging services are available by access to a voice services feature associated with a telephone key system or a telephone exchange. Exemplary are telephone systems identified by the trademark Meridian, manufactured by Northern Telecom Limited.

If a called party is a user of a centralized voice services feature, when the called party is momentarily unavailable to answer the calling party's call, the calling party is connected with the centralized voice services feature. The voice services feature solicits a voice response from the caller on behalf of the called party. Sometime later the called party may access the voice services feature and be advised of the call by listening to the recorded voice response of the calling party. This voice message service has proven to be popular and convenient. However if the calling party has some urgent matter to discuss with the called party and the calling party is unavailable, the voice service feature is of no advantage and can be a serious impediment to achieving a real time communication. Expeditious delivery of an urgent message via a voice services feature is invariably contingent upon the called party being in the habit of frequently checking with the voice services feature for any messages.

In telephone systems available for business communications, prior to the popularity of voice services features, the availability of a busy or absent called party was enhanced by features known as "override" and "ring again". In the event that the called party was busy or failed to answer, the calling party could press a key on his telephone set to invoke the override feature or the ring again feature. In accordance with the ring again feature, when the called party subsequently went ON HOOK, the telephones of the calling party and the previously called party would be caused to ring by the telephone exchange. When both parties answered they were coupled in telephone communication, one with the other, via the telephone system. The override feature is more obtrusive than the ring again feature. In accordance with the override feature, upon receiving a busy tone the calling party is able to break into an ongoing telephone conversation. In accordance with the override feature, the telephone exchange responds to an indication from the calling party by creating a conference bridge so that the calling party becomes a full participant in the previously established telephone conversation.

The functionality of the override and ring again features has been sharply reduced by the wide spread use of voice features services. If a telephone caller finds that his call has been completed to the called party's voice message service, the caller is helpless to effect any action except to leave a voice message. If the calling party is in urgent need to communicate directly with a called party, interception by a machine can be very frustrating. In some systems the knowledgeable caller may have an option of dialling an appropriate digit to tag their message as "urgent", so that it will be identified to the called party as such, if and when the called party accesses his voice mail feature. Sometimes the calling party is given the option of either leaving a message or pressing "0" on their dial pad to speak with a secretary or an attendant. In this case, the voice services feature apparatus acts somewhat like an automated attendant by placing a second telephone call to a predetermined number. However this may only lead to greater frustration because in some instances pressing "0" only begets yet another prerecorded voice solicitation urging deposit of a voice message for the secretary. Calling party features, as provided in accordance with a calling party's class of service such as ring again and override, are simply non-functional once the calling party's call has progressed to being connected to a features server associated with the called party. As far as the call controller in the telephone exchange is concerned, the call progress has been completed through to its conversational portion. The only subsequent action to which the call controller may respond is that of either the calling party or the features server apparatus going ON HOOK. The only alternative the calling party may use in order to establish a real time conversation is to hang up, go OFF HOOK, and redial the called party's telephone number, repeatedly, until the intended telephone for which the call is destined is answered by a person. Such desperate action is time consuming for the calling party and is deleterious to the operation of the telephone exchange as frequent redialling actions have been found to be a significant consumer of processing resources in the call controller.

SUMMARY OF THE INVENTION

It is an object of the invention to provide a call progress option for a calling party whose telephone call has been connected via a switching facility to a central voice feature server apparatus for providing a feature associated with a called party. The call progress option permits the calling party to alter the call progress and invoke a calling party associated feature instead of the called party associated feature.

The invention provides a method for operating a telephone switching facility in combination with a voice features server apparatus, whereby a calling party may redirect a call progress. In accordance with the method, the telephone switching facility initiates a call progress on behalf of a calling party in response to digits dialled by the calling party. In the event of the call progresses being forwarded to the voice features server apparatus, instead of being completed to a called party, the call progress is continued in the voice features server apparatus while any secondary signalling which may be generated by the calling party is detected. In the event that secondary signalling is detected prior to the conclusion of a solicitation portion of the call progress, and if the detected secondary signalling is not within the protocol of the voice services feature apparatus, the secondary signalling is transferred to the telephone switching facility which then resumes the call progress in accordance with the secondary signalling.

In an example of the invention, the secondary signalling corresponds to a request for either a ring back feature or an override feature either of which is included in the call progress by the telephone switching facility.

A telephone system, in accordance with the invention, comprises a telephone switching facility in combination with a voice feature server apparatus, wherein the voice feature server apparatus includes means for recognizing a feature request signalled from a calling party as being unrelated to the voice feature server apparatus, and the telephone switching facility includes means for retrieving and resuming the call progress to the exclusion of the voice feature server apparatus in response to the signalled request.

In one example, the telephone system includes a telephone switching facility connected to provide telephone communications as directed by a call controller for controlling call progresses between various telephone sets, in response to signals from the various telephone sets. A voice feature server apparatus is connected to the telephone switching facility for providing a voice services call progress completion function as directed by a server controller on behalf of a called party, in response to the call of a calling party having progressed thereto. The voice feature server apparatus includes a secondary signalling detection means for receiving any secondary signalling from the calling party. The voice feature server apparatus also includes means for transferring secondary signalling received during a solicitation portion of a voice answering progress to the call controller, if the secondary signalling is not within the protocol of the server controller. The call controller includes means for forwarding a call progress intended for a called party to the voice feature server apparatus in response to a predetermined condition; and means for retrieving and resuming the call progress within the telephone switching facility, in accordance with secondary signalling having been transferred from the voice feature server apparatus.

BRIEF DESCRIPTION OF THE DRAWINGS

An example of the invention is discussed with reference to the accompanying drawings in which.

DESCRIPTION OF THE EXAMPLE EMBODIMENTS

Figure 1:
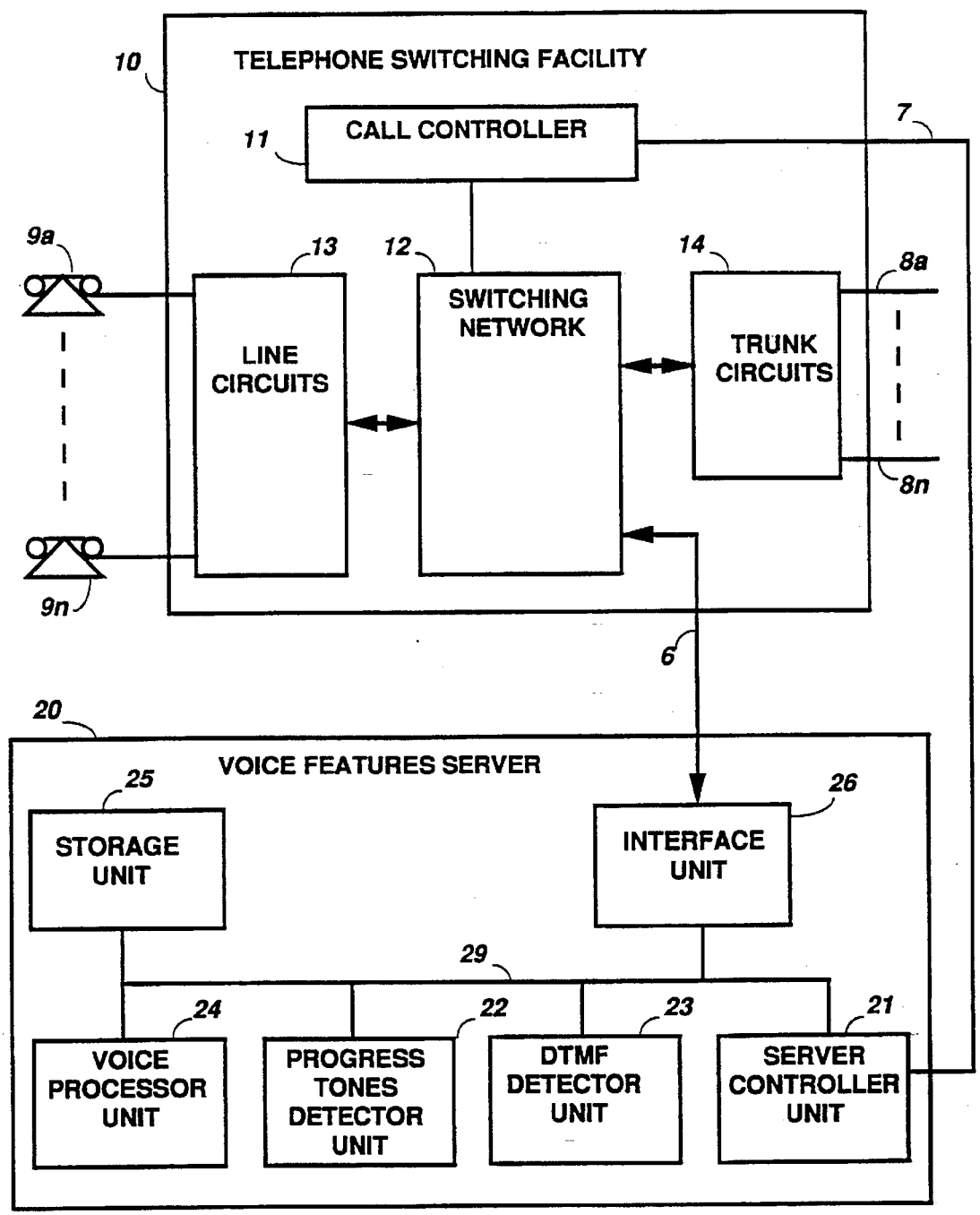
FIG. 1 is a schematic block diagram of a telephone system.

The centrally located telephony common equipment illustrated in FIG. 1 includes a telephone switching facility 10, which in turn includes a switching network 12, line circuits 13 and trunk circuits 14, which are operative under control of a call controller 11, to provide communication paths between calling and called ones of telephone station sets 9a–9n and between the telephone stations sets 9a–9n and various of trunks 8a–8n. Telephone facilities of this general form and function are well known to persons of typical skill in the art of electronic switched telephony. However for convenience of description, the operation of a typical telephone switching facility is briefly reviewed.

In its operation, the telephone switching facility 10 utilizes various service circuits, not shown, for generating and detecting telephony signalling and supervision signals and interfacing signalling and supervision information with the call controller 11. During typical operations, one of the functions in the progress of a telephone call is that of receiving signalling, representative of dialled or pressed digits, from a calling party at one of the telephone sets 9a–9n. When the dialled or pressed digits are representative of a telephone number of a called party, they are referred to as primary signalling. During the initial portion of a telephone call, dial tone is supplied to the calling party and indicates that the telephone switching facility 10 has connected a service circuit to receive and detect primary signalling. After the telephone switching facility 10 is satisfied that the primary signalling has been received, the service circuit is disconnected, and it is then available for another telephone call.

Dialled or pressed digits which may be originated at a telephone station set sometime later, during a conversational portion of the call progress, are usually referred to as secondary signalling. Secondary signalling is relied upon to provide telephone users with access to, and control of, telephony features such as voice messaging. As a matter of convenience, secondary signalling is usually transmitted in the form of dual-tone multifrequency (DTMF) signals. DTMF signals are transmittable by way of voice band communication paths and hence may be responded to by any telephone facility involved with the telephone call, without participation of the telephone facility directly associated with the calling party.

Secondary signalling may also be communicated in any of various proprietary digital signal formats, as is typical of some digital signal private branch exchanges (PBXs) and digital signal key telephone systems, for example systems available from the assignee, Northern Telecom Limited, under the trademark MERIDIAN. In any event, if use is made of secondary signalling, provision is made for continuous monitoring of the conversational portion of the call progress to receive and detect any occurrence of secondary signalling. It may be possible to monitor all telephone calls for secondary signalling, however, at considerable equipment expense. Consequently, secondary signalling is not usually provided for unless the telephone user takes some action, such as flashing the switch hook, or unless the telephone call has been routed to, or intercepted by, a special facility, for example a voice features server 20 as shown in FIG. 1.

The voice features server 20, as shown in FIG. 1, is exemplary of apparatus which is well known to be convenient for providing feature services to a telephone switching facility. The voice features server 20 includes a server controller unit 21 which is coupled with the call controller 11 via a command and status link 7. The call controller 11 directs functions of the voice features server 20 and is informed of its status via the command and status link 7. The server controller unit 21 is connected in common with a progress tones detector unit 22, a DTMF receiver sender unit 23, a voice processor unit 24, a storage unit 25 and an interface unit 26, via a communications bus 29. Digital signals, in the form of frame oriented channels of pulse code modulation (PCM), are coupled between the switching network 12 and the voice features server 20 via a time division multiplex (TDM) link 6 under the direction of the call controller 11 and the server controller 21, functioning in concert. One example of apparatus which has been used to provide a practical voice features server, is disclosed in U.S. Pat. No. 4,608,685, titled "Packet and Circuit Switched Communications Network" issued to the assignee, Northern Telecom Limited, on Aug. 26, 1986.

In operation, the server controller 21 responds to commands from the call controller 11, to direct the interface unit 25 to receive PCM signals from designated channels in a receive bit stream on the TDM link 6, and/or to transmit PCM signals into designated channels in a transmit bit stream on the TDM link 6. Called or calling party identity information is used by the voice processor 24 for purposes of indexing and packetizing PCM synchronous information in preparation for storage of a voice message in the storage unit 25. By a similar but complementary process, voice messages are also retrieved from the storage unit 25 and depacketized into synchronous channels by the voice processor 24, for transmission via the telephone switching facility 10.

A registered user of the voice message feature may gain direct access to the voice message feature by dialling a predetermined number, followed by further dialling which is treated as secondary signalling. The secondary signalling is used to effect control of the voice message feature for performance of various functions, such as personalizing of a telephone answering function by deposit of a personal solicitation or greeting for later receipt by a caller whose telephone call to the subscriber has been forwarded to the voice features server 20. The registered user may also deposit voice messages for subsequent delivery to designated telephone sets and may likewise receive voice messages from other registered users. User features such as composing, reviewing, editing, addressing, redirecting and archiving voice messages, may be available by means of secondary signalling. Hence during any process of depositing or retrieving a message, the DTMF receiver sender unit 23 monitors all assigned synchronous channels for any DTMF secondary signalling.

When a telephone call is forwarded to the voice features server 20, it is usually the result of one of several possible call progress scenarios, for example:

i) the called party has previously arranged to have their incoming calls routed to the voice features server 20 for answering;

ii) the called party is already engaged in telephone usage; and iii) the called party has failed to answer the telephone call after a designated number of rings.

In any case the calling party is the recipient of an audible voice solicitation, which as discussed before, leaves the calling party with no alternative but to leave a voice message or hang up and try again.

Once the calling party ascertains that an invitation to leave a message is in the process of being delivered from an automated message service or answering machine, the calling party is provided with the option of escaping from the called party's voice message feature by signalling for a calling party feature to be substituted. In one example, the calling party may signal to escape, whereafter the telephone switching facility provides an indication of what calling party feature or features are logically available, so that the calling party may choose the feature which is felt to be appropriate under the circumstances of the moment.

For example, if the called party is presently in a real time conversational portion of a telephone call, the telephone switching facility provides indication to the calling party that either the ring back or override features is logically appropriate.

If the calling party chooses the ring back feature, the calling party subsequently goes ON HOOK and thereafter when the telephone sets of both the calling party and the called party are coincidentally ON HOOK, the calling party's set is rung by the telephone switching facility. When the calling party answers, the telephone set of the called party is rung by the telephone switching facility while an appropriate audible progress tone or message is transmitted to the calling party. The call progress proceeds normally to the conversational portion without interference or interception, until either of the parties hangs up whereupon the call progress ends. Of course there may be exceptions, for example, if the called party has declined all calls or calls originating from the telephone set of the calling party, the ring back call progress will either not be indicated as being available to the calling party or alternatively it will simply not be executed by the telephone switching facility.

Alternately, if the calling party chooses the override feature, the telephone switching facility provides a conference connected between the calling party and the called party's conversation in progress. As this may be viewed as a gross intrusion of privacy, it is preferred that the parties in the conversation in progress be forewarned of the intrusion by a voice announcement or at least a distinctive warning tone from the telephone switching facility.

However, if the called party fails to answer in response to ringing or is unavailable for reasons other than being a participant in a real time conversation, the override feature is not logically functional and the calling party is restricted to selecting the ring again feature. If the calling party chooses the ring again feature, the ring again call progress proceeds in a manner similar to that already described.

Figure 2:
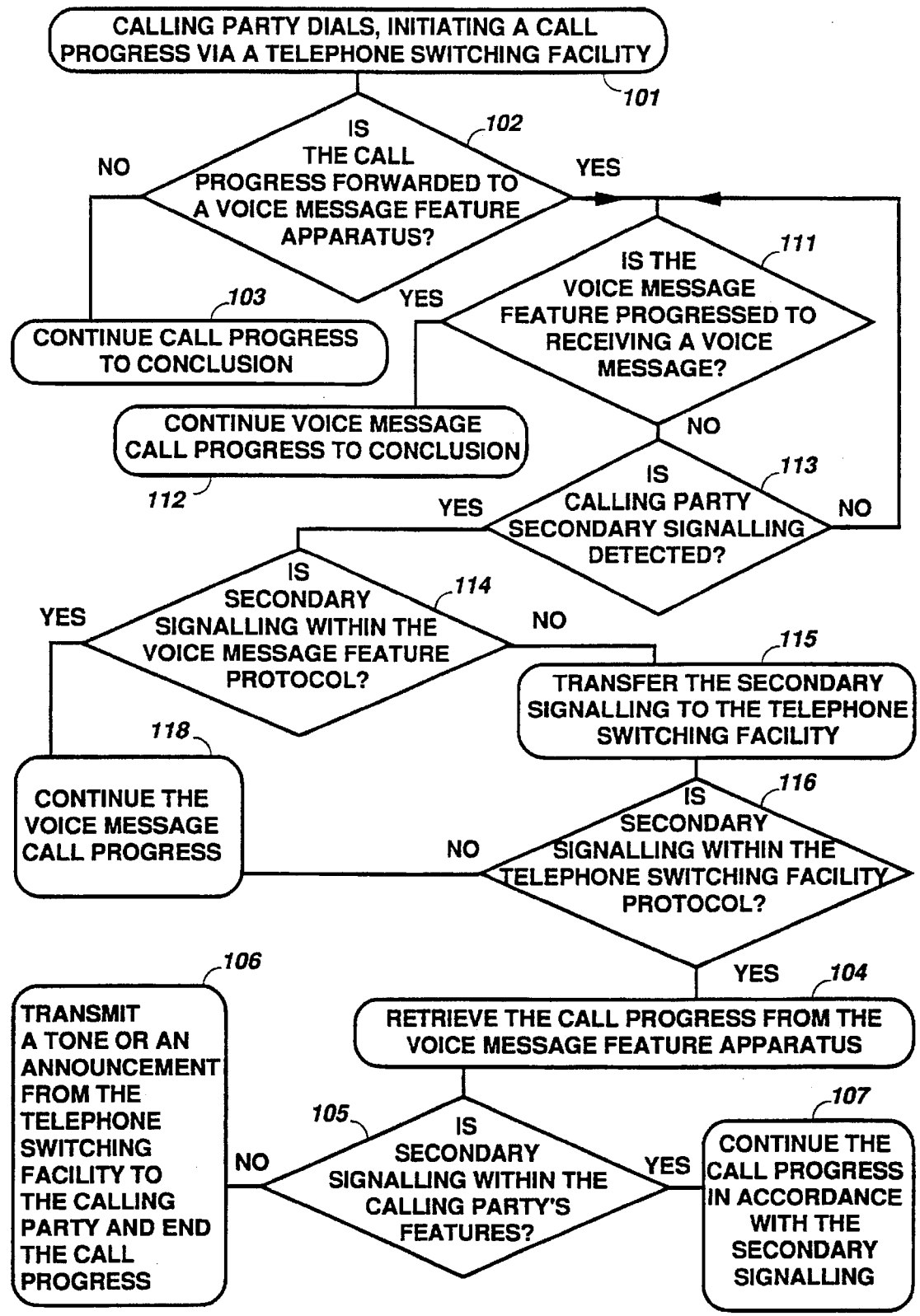
FIG. 2 is a flow chart diagram illustrative of a method of operation of the telephone system illustrated in FIG. 1 in accordance with the invention.

The sequence of functions illustrated in FIG. 2 permit the calling party to redirect a call progress that has been directed into a called party's service feature. Calling party dialling which is primary signalling from a calling party, initiates a call progress in an associated telephone switching facility as shown in a function block 101. In this case, the telephone switching facility 10 determines the progression and destination of the call set up in accordance with the dialled information and the prevailing conditions in the telephone system. If the call is not forwarded to a called party service feature, it will normally progress to conclusion in a typical manner as indicated in a function block 103. As indicated in a decision block 102, if the call set up is diverted to, or otherwise intercepted by, a voice message feature, the features server 20 monitors the progress of the feature in relation to the telephone call as indicated in decision blocks 111 and 113. Providing that secondary-signalling from the calling party has not been detected prior to the call having progressed to receiving voice signals from the calling party, the voice message function proceeds to its normal conclusion as indicated in a function block 112. If secondary signalling from the calling party is detected, and the secondary signalling is within the protocol of the voice message feature as indicated in decision blocks 113 and 114, the voice message function proceeds accordingly, as shown in a function block 118. However, if the secondary signalling is not within the protocol of the voice message feature, the secondary signalling is transferred to the telephone switching facility, as required in a function block 115. As indicated in a decision block 116, the secondary signalling is tested to determine if it is of logical meaning to the telephone switching facility 10. If NO, the voice message call progress continues as indicated before in block 118. If YES, the call is disconnected from the voice features server 20 by the telephone switching facility 10, as indicated in a function block 104. As indicated in a decision block 105, the telephone switching facility resumes the call progress by determining if the secondary signalling specifies a function that is within the calling party's class of service. If NO, as indicated in a function block 106, an appropriate tone or announcement may be transmitted to the calling party before the call progress is ended. If YES, the call progress continues as indicated in function block 107, in accordance with the secondary signalling, to completion of the call progress.

As discussed, the flow chart in FIG. 2 illustrates a method by which the calling party is able to retrieve the call progress from the called party's voice features service, the retrieval being contingent upon secondary signalling received by the voice features service apparatus 20, being in the protocol of the telephone switching facility 10. Having retrieved the call progress in FIG. 2, FIG. 3 illustrates a method for providing a calling party feature being either that of the ring back feature or the override feature.

Figure 3:
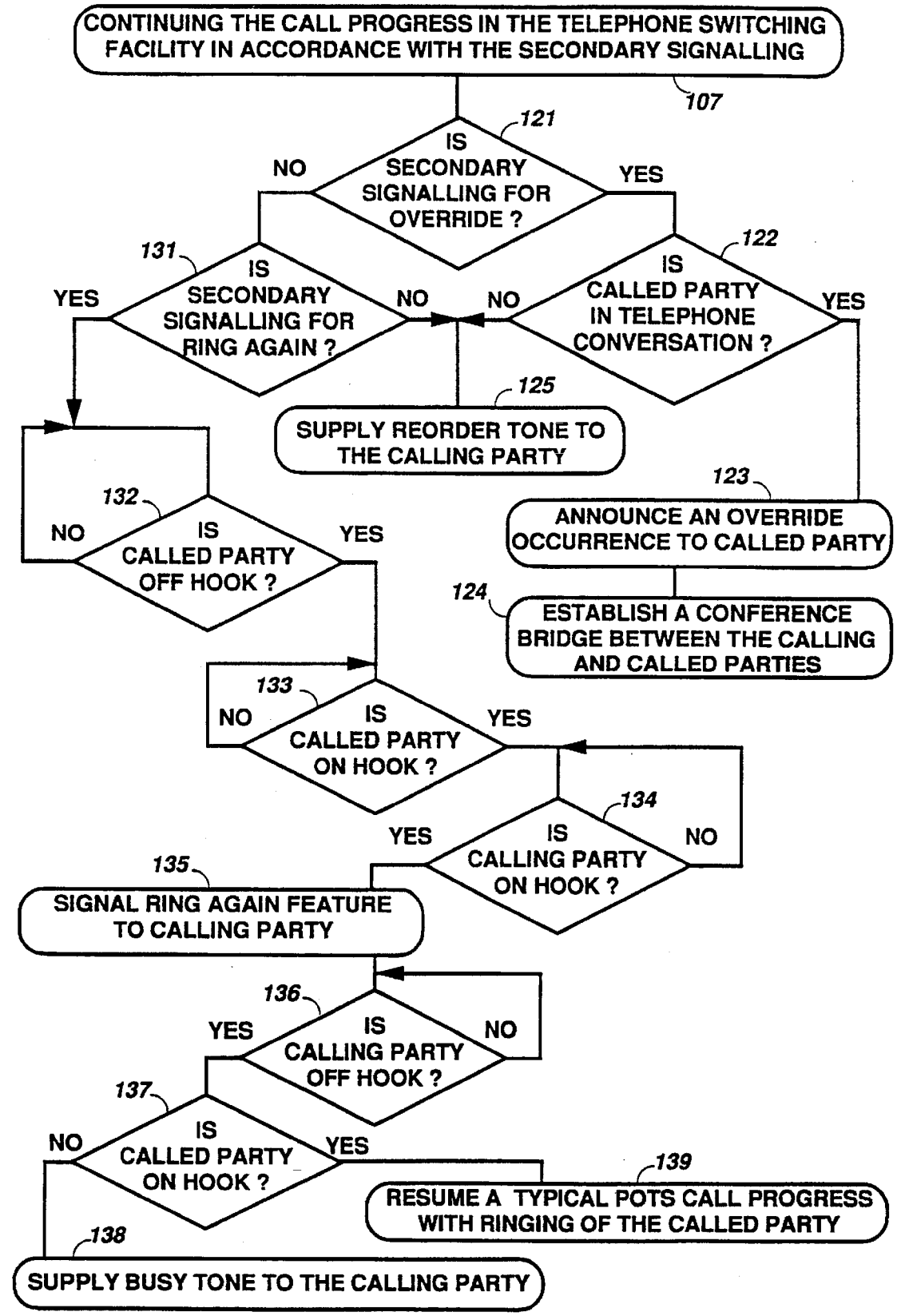
FIG. 3 is a flow chart diagram illustrative of the method in FIG. 2 for providing either of ring back and override call progresses subsequent to a call having initially progressed to a voice services feature.

In FIG. 3 the call progress continues as indicated in function block 107 with a determination of whether or not the secondary signalling specifies the override feature, as shown in a derision block 121. If the override feature is specified and the called party is at that instant in a telephone conversation, as determined in a decision block 122. An override warning announcement is bridged immediately into the conversation and thereafter the calling party is conference connected with the conversation, as shown function blocks 123 and 124. On the other hand, if the called party is at that instant not in a telephone conversation, as for example being ON HOOK or in communication with the voice features server, the calling party is provided with an audible indication that the override feature is not for the moment available, as illustrated in a function block 125.

In the derision block 121, if it was determined that the secondary signalling was not for the override feature, then in decision block 131, it is determined whether or not the secondary signalling is for the ring again feature. If it is not, the secondary signalling could be tested for some other relevant information, but in this example, the calling party is simply provided with the audible indication illustrated in the function block 125. However, if the ring again feature is specified, the called party's presence is indicated at a time when the called party goes OFF HOOK and the called party's availability to receive a telephone call is indicated when the called party goes back ON HOOK, as determined in decision blocks 132 and 133. In the event that the calling party is ON HOOK, as determined in a decision block 134, or is effectively so, for example, if the called party is active but subscribes to message waiting, the telephone switching facility 10 signals the calling party as indicated in a function block 135. As determined at a derision block 136, when the calling party responds by going OFF HOOK, the called party is checked to see if their telephone set is still ON HOOK in accordance with decision block 137 and, if so, if the called party is signalled with ringing and the called party hears a RING BACK tone as in a typical POTS call progress. However, if in decision block 137 the called party has gone OFF HOOK since being checked as indicated by the decision block 133, the typical POTS call progress of supplying BUSY tone to the calling party is effected as indicated in a function block 138.

It should be apparent from the foregoing description that the primary feature illustrated by way of this example is that of permitting telephone callers to extract a telephone call from the special services feature of the called party and attempt to achieve a real time telephone conversation with the called party. The intended real time telephone conversation is attempted by invoking a calling party service feature which is functional with respect to the actual states of the telephone sets of both the calling and called parties and therefore must not be interfered with by any intercept or call transfer or call forward function intended by the called party. Hence it will be apparent to persons of typical skill in the telephony arts that the calling party feature must be controlled by the telephone switching facility associated with the called party feature in order to proceed toward the conversation portion of the call progress in a manner similar to POTS. Furthermore, the benefits of the invention are not limited to any one telephone exchange but may be provided across a network of exchanges.

We claim:

1. A method for operating a telephone switching facility for serving at least one telephone set, the telephone switching facility being connected in combination with a voice features service apparatus whereby a calling party may redirect a call progress, the method comprising the steps of:
   (a) initiating the call progress on behalf of the calling party in response to digits dialled by the calling party;
   (b) in an event of the call progress being forwarded to the voice features service apparatus, continuing the call progress in the voice features service apparatus while detecting any secondary signalling which may be generated by the calling party; and (c) in the event that a secondary signalling is detected prior to a completion of a solicitation portion of the call progress, and if the secondary signalling is not within the protocol of the voice features service apparatus, responding to the secondary signalling in the telephone switching facility by resuming the call progress in accordance with the secondary signalling.

2. A method as defined in claim 1 wherein, in response to the secondary signalling not being within the protocol of the telephone switching facility, continuing the call progress in the telephone switching facility to transmission of an audible advisory tone or announcement to the calling party.

3. A method as defined in claim 1 wherein in response to the secondary signalling corresponding to a service feature of the telephone switching facility, invoking said service feature in the call progress.

4. A method as defined in claim 3 wherein the service feature is either a ring back feature or an override feature.

5. A method as defined in claim 4 wherein the service feature is the ring back feature, said call progress including the further steps of:

ringing the telephone set of each of the called party and the calling party in response to the calling party being ON HOOK and the called party being ON HOOK, and continuing said call progress into a conversational portion response to the calling party and the called party going OFF HOOK.

6. A method as defined in claim 5, wherein after the called party goes ON HOOK the telephone switching facility signals the telephone set of the calling party indicating the possibility of completing said ring back call progress and in response to a predetermined signal from the telephone set of the calling party, the telephone switching facility continues said ring back call progress.

7. A method as defined in claim 4 wherein the service feature is said override feature and the call progress includes the further steps of:

signalling from the telephone switching facility to the telephone set of the calling party that the override feature is available in response to the telephone set of the called party being in a conversational portion of a call progress; and in response to a predetermined signal from the telephone set of the calling party, establishing a conference bridge with the called party.

8. A telephone system comprising:

a telephone switching facility for serving at least one telephone set, the telephone switching facility being connected in combination with a voice feature server apparatus, wherein the voice feature server apparatus includes means for detecting a feature request signalled by secondary signalling from a calling party, the secondary signalling not being within the protocol of the voice feature server apparatus, and the telephone switching facility including means for retrieving and resuming the call progress to the exclusion of the voice feature server apparatus in response to the request signalled by the secondary signalling.

9. A telephone system comprising:

a telephone switching facility for connection with at least one telephone set being operable to provide telephone communications as directed by a call controller for controlling telephone calls between various telephone sets, in response to signals from the various telephone sets;

a voice feature service apparatus being operable in combination with the telephone switching facility for providing a voicemail service;

in the voice feature service apparatus, a secondary signalling detection means for receiving any secondary signalling from a telephone of a calling party, a service controller unit for directing a progress of the voicemail service on behalf of a called party in response to a telephone call of a calling party having been connected to the voice feature service apparatus by the telephone switching facility, and for transferring secondary signalling received during a solicitation portion of the progress of the voicemail service and not within a protocol of the service controller unit, to the telephone switching facility; and in the telephone switching facility, the call controller, being operative for causing connection of said telephone call to the voice feature server apparatus in response to a predetermined condition; and being operative for disconnecting said telephone call from the voice feature service apparatus and resuming the call progress within the telephone switching facility in accordance with the secondary signalling identifying a calling party feature having been transferred from the voice feature service apparatus.

* * * * *